United States Patent [19]
Pollard

[11] Patent Number: 6,094,321
[45] Date of Patent: Jul. 25, 2000

[54] RECORDING MEDIUM ASSEMBLY TRANSPORT SYSTEM WITH PERPENDICULAR ENGAGEMENT PIECE

[75] Inventor: Christopher Anthony Pollard, Monument, Colo.

[73] Assignees: Sony Electronics Inc., Park Ridge, N.J.; Sony Corporation, Tokyo, Japan

[21] Appl. No.: 08/748,676

[22] Filed: Nov. 13, 1996

[51] Int. Cl.[7] .......................... G11B 15/68; G11B 17/04; B65G 65/00

[52] U.S. Cl. ...................... 360/92; 360/98.06; 369/191; 414/280

[58] Field of Search ................................. 360/92, 98.04, 360/98.06; 369/191; 414/280

[56] References Cited

U.S. PATENT DOCUMENTS

| | | | |
|---|---|---|---|
| 4,169,621 | 10/1979 | McGill | 294/116 |
| 4,614,474 | 9/1986 | Sudo | 414/281 |
| 4,701,900 | 10/1987 | Hasegawa et al. | 369/36 |
| 4,734,814 | 3/1988 | Fujino et al. | 360/133 |
| 4,755,978 | 7/1988 | Takizawa et al. | 369/37 |
| 4,827,463 | 5/1989 | Motoyoshi et al. | 369/36 |
| 4,918,548 | 4/1990 | O'Donnell et al. | 360/92 |
| 4,984,106 | 1/1991 | Herger et al. | 360/92 |
| 4,998,232 | 3/1991 | Methlie et al. | 369/36 |
| 5,010,536 | 4/1991 | Wanger et al. | 369/36 |
| 5,014,255 | 5/1991 | Wanger et al. | 369/36 |
| 5,036,503 | 7/1991 | Tomita | 369/36 |
| 5,043,962 | 8/1991 | Wanger et al. | 369/36 |
| 5,123,000 | 6/1992 | Fitzgerald et al. | 369/36 |
| 5,128,912 | 7/1992 | Hug et al. | 369/38 |
| 5,146,375 | 9/1992 | Satoh et al. | 360/92 |
| 5,450,391 | 9/1995 | Pollard | 369/191 |
| 5,689,490 | 11/1997 | Pollard | 369/77.2 |
| 5,805,561 | 9/1998 | Pollard | 369/178 |
| 5,813,817 | 9/1998 | Matsumiya | 360/92 |

FOREIGN PATENT DOCUMENTS

| | | | |
|---|---|---|---|
| 56-74876 | 6/1981 | Japan | G11B 25/04 |
| 2-81352 | 3/1990 | Japan | G11B 15/68 |
| 2107106B | 4/1983 | United Kingdom . | |

*Primary Examiner*—A. J. Heinz
*Attorney, Agent, or Firm*—Limbach & Limbach, LLP

[57] ABSTRACT

A jukebox for a plurality of recording medium assemblies (such as trays bearing discs) which includes a horizontal transport system wherein an engagement actuator (such as a solenoid) effects movement of an engagement piece. The engagement piece is moved between a position of being engaged with the recording medium assembly and a position of non-engagement with the recording medium assembly. The engagement actuator is linked to the engagement piece through a pivoting crank, so that the direction of motion of the engagement actuator is different than the direction of motion of the engagement piece.

11 Claims, 19 Drawing Sheets

RECORDING MEDIUM ASSEMBLY TRANSPORT SYSTEM WITH PERPENDICULAR ENGAGEMENT PIECE

BACKGROUND OF THE INVENTION

The present invention relates to 'jukeboxes.' A 'jukebox' (as that term is used herein) is an apparatus for storing and transporting a plurality of recording medium assemblies. The recording medium assemblies may be, for example, cartridges containing optical discs or CD-ROM discs. Alternatively, the recording medium assemblies may be a disc recording medium which is placed in a tray for transport within the jukebox. More specifically, the present invention relates to a recording medium assembly transport system for moving a recording medium assembly within a jukebox.

DESCRIPTION OF THE RELATED ART

FIG. 1 shows a simplified, conventional jukebox 1 for storing and transporting a plurality of optical disc cartridges. The jukebox 1 includes cartridge shelves 2, a cartridge delivery/eject assembly 3, a disc drive 4, a threaded post 6, second post 7a, a third post 7b and a carriage assembly 8.

The cartridge shelves 2 are arranged in two columns. Each cartridge shelf 2 can store a cartridge 5 when it is not in use. Although the jukebox in FIG. 1 has only 12 cartridge shelves 2 (for storing 12 recording mediums), larger scale jukeboxes may have upwards of 100 cartridge shelves and may store upwards of 100 cartridges.

The cartridge delivery/eject assembly 3 delivers cartridges 5 to the jukebox 1. For example, an operator (not shown) may insert a cartridge 5 in the direction shown by arrow C into the cartridge delivery/eject assembly 3. The cartridge delivery/eject assembly 3 then presents the cartridge 5 at the interior of the jukebox 1 at a location corresponding to the location of the cartridges 5 in the right column of shelves 2. The cartridge delivery/eject assembly 3 also ejects cartridges 5 from the jukebox 1 by a reverse process from the delivery process described above. For example, the cartridge delivery/eject assembly 3 ejects a cartridge 5 from the jukebox in the direction shown by arrow D. By using the delivery/eject assembly 3, an operator can selectively add or remove recording mediums from the jukebox 1.

The disc drive 4 records and/or reproduces the recording mediums. The disc drive 4 is selected to be compatible with the type of recording mediums used in the jukebox 1. For example, the disc drive 4 may be constructed to record and/or reproduce magnetic discs, optical discs or magneto-optical discs. In larger scale jukeboxes, there may be more than one disc drive 4. For example, for jukeboxes used with computer networks having multiple users, there may be several disc drives to accommodate the multiple users.

Because the jukebox 1 must be able to transport cartridges 5 between the cartridge shelves 2, the delivery/eject assembly 3 and the disc drive 4, the jukebox 1 has a recording medium transport system including a threaded post 6, a second post 7a, a third post 7b and a carriage 8. The threaded post 6 is engaged by its threads with carriage 8. Second post 7a passes through a bearing (not shown) in the carriage 8. The third post 7b passes through another bearing (not shown) in the carriage 8. The carriage 8 can carry a cartridge 5 to effect this vertical transport (in the direction shown by double arrow A) between the shelves 2, delivery/eject assembly 3 and the disc drive 4.

More specifically, the carriage 8 can be driven in the vertical direction by rotating the threaded post 6 about its longitudinal axis. The second post 7a helps to provide for stable vertical movement of the carriage 8. The third post 7b restricts rotation of the carriage 8 about the second post 7a.

For example, as shown in FIG. 1, the disc drive starts to transport a cartridge 5 from the fifth shelf 2a down on the left column of shelves, to the disc drive for reproduction. However, as shown in FIG. 1, the cartridge must again also be transported in the horizontal direction (shown by double arrow B) into the carriage 8. Also, after the carriage 8 (carrying cartridge 5) is moved down to the vicinity of the disc drive 4, the cartridge must be transported in the horizontal direction from the carriage 8, into the disc drive 4. Apparatus for effecting this kind of horizontal transport of recording medium assemblies will sometimes be referred to herein as horizontal transport systems.

This horizontal transport of cartridges into and out of a jukebox carriage will now be explained with reference to the apparatus shown in FIG. 2. FIG. 2 shows a top view of a portion of a jukebox which is more fully described in U.S. Pat. No. 5,450,391. U.S. Pat. No. 5,450,391 is hereby incorporated by reference. As shown in FIG. 2, a carriage 10 engages cartridge 20. More specifically, moveable gripper arms 12 are moved into notches 22 which are cut into the sides of cartridge 20. Once the gripper arms 112 are engaged with the notches 22, the gripper assembly 114 is moved back (in the direction shown by arrow E) into the carriage 10. This transports the cartridge 20 into the carriage 10 through engagement of the gripper arms 12.

When the gripper arms 12 are engaged with the cartridge 20 (as shown in FIG. 2), the gripper arms 12 are biased inwardly, or toward the sides of the cartridge by four springs 14, 16, pivot points 18 and the rest of the gripper arm biasing assembly 19.

FIG. 3 shows the carriage 10 in a position of disengagement with a cartridge 20. For example, the cartridge 20 needs to be disengaged from gripper arms 12 and carriage 10 after if has been pushed back onto a cartridge shelf. The gripper arms 20 are biased outwardly, away from the notches 22, thereby releasing the cartridge 20. The outward biasing of the gripper arms 12 is effected by repositioning parts of the gripper arm biasing assembly 19 and by characteristics of the springs 14, 16. (The biasing of the gripper arms are more fully explained in U.S. Pat. No. 5,450,391.)

Although the carriage 10 and gripper arms 12 can be an effective apparatus for horizontal transport of recording mediums within a jukebox, this system requires a relatively great amount of space. It is also noted that the gripper arm biasing assembly 19 is in the horizontal path of the cartridge 20. This embodiment therefore does not allow the carriage to transfer a cartridge 5 from the right column to the left column or from the right column to the left column because the cartridge 5 is blocked by the gripper arm biasing assembly 19.

SUMMARY OF THE INVENTION

It is an object of the present invention to provide a jukebox with a reliable horizontal transport system which is relatively uncomplicated, small and inexpensive.

It is a further object of the present invention to provide a horizontal transport system wherein the direction of motion of an actuating means (such as a solenoid) can be different than the direction of motion of a piece which engages the recording medium assembly.

It is a further object of the present invention to provide a horizontal transport system which is substantially outside of the path of recording medium assemblies which are moved horizontally onto and off of the carriage.

It is a further object of the present invention to provide a horizontal transport system which can move recording medium assemblies between columns on opposite sides of the carriage.

It is a further object of the present invention that a single, one point actuating motion (e.g., the motion of a solenoid) can provide for stable parallel motion of a parallelogram assembly. This is advantageous in that it allows a relatively short guidance system which would otherwise require more space.

According to the present invention, a transport system moves a recording medium assembly along a first axis. For example, the transport system moves trays bearing recorded discs along the first axis in a horizontal direction onto and off of a carriage. The recording medium assembly transport system includes a transport member, a crank and an engagement actuator.

The transport member is translatable along the first axis. The transport member includes an engagement piece which is translatable along a second axis, which is perpendicular to the first axis, so that the tray engagement piece moves along the second axis between an engagement position and a non-engagement position. For example, the engagement piece may be a tab which can be moved into and out of engagement with a notch on a recording medium assembly by being moved along the second axis. If the tab is engaged with a notch on the recording medium assembly, translation of the transport member (and engagement piece) along the first axis will then effect movement of the recording medium assembly.

The crank has a first attachment point, a second attachment point and a pivot point. The first attachment point, the second attachment point and the pivot point are not co-linear. For example, the crank may be a bell crank with the first and second attachment points being displaced from each other approximately 90° about the pivot point. The first attachment point is linked to the engagement piece. In this way, if forces applied at the second attachment point rotates the crank about the pivot point, then the first attachment point will also rotate, thereby translating the engagement piece linked thereto between the engagement and non-engagement positions.

The engagement actuator is translatable between a first position and a second position and is linked to the second attachment point so that when the engagement actuator moves from the first position to the second position, the movement pivots the crank linked thereto about the pivot point and causes the engagement piece to move from the non-engagement position to the engagement position.

It is also noted that there generally are additional intermediate links between the actuator and crank and between the crank and the engagement piece.

BRIEF DESCRIPTION OF THE DRAWINGS

FIG. 9 shows a transport nut and engagement piece in a position of non-engagement with a recording medium assembly 105a.

FIG. 10 shows a transport nut and engagement piece in a position of engagement with a recording medium assembly 105a.

FIG. 11 shows a transport nut and engagement piece in a position of engagement with a recording medium assembly 105a.

FIG. 12 shows a transport nut and engagement piece in a position of non-engagement with a recording medium assembly 105a.

FIG. 13 shows a transport nut and engagement piece in a position of engagement with a recording medium assembly 105a.

FIG. 14 shows a transport nut and engagement piece in a position of engagement with a recording medium assembly 105a.

DETAILED DESCRIPTION OF THE PREFERRED EMBODIMENTS

Figure 1:
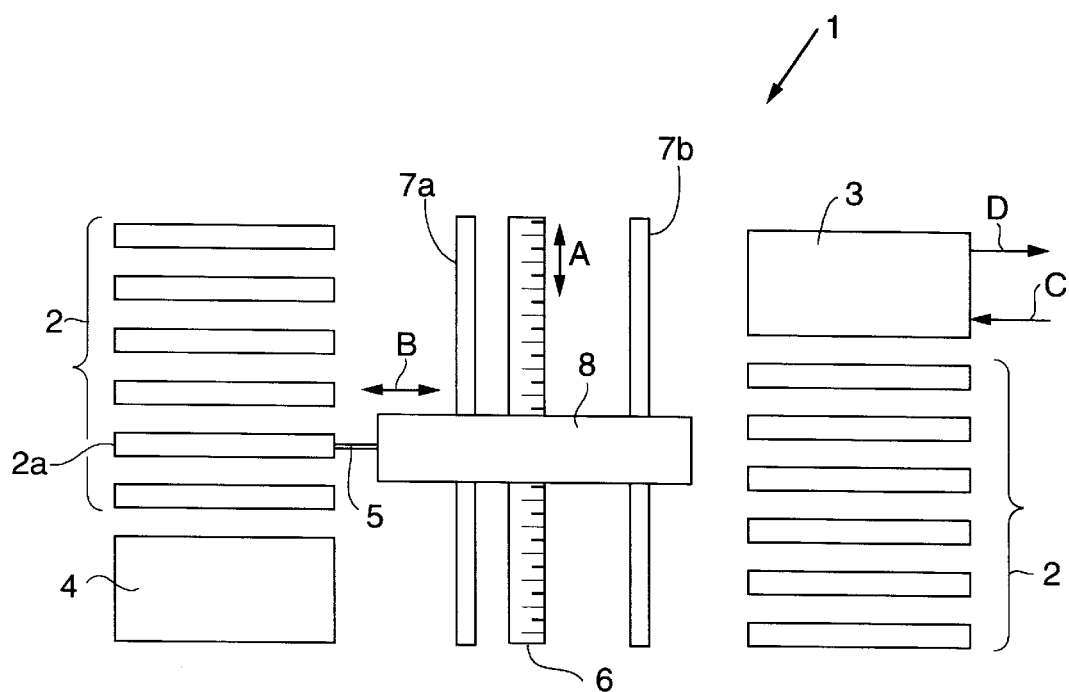
FIG. 1 shows a first embodiment of a conventional jukebox.
Figure 2:
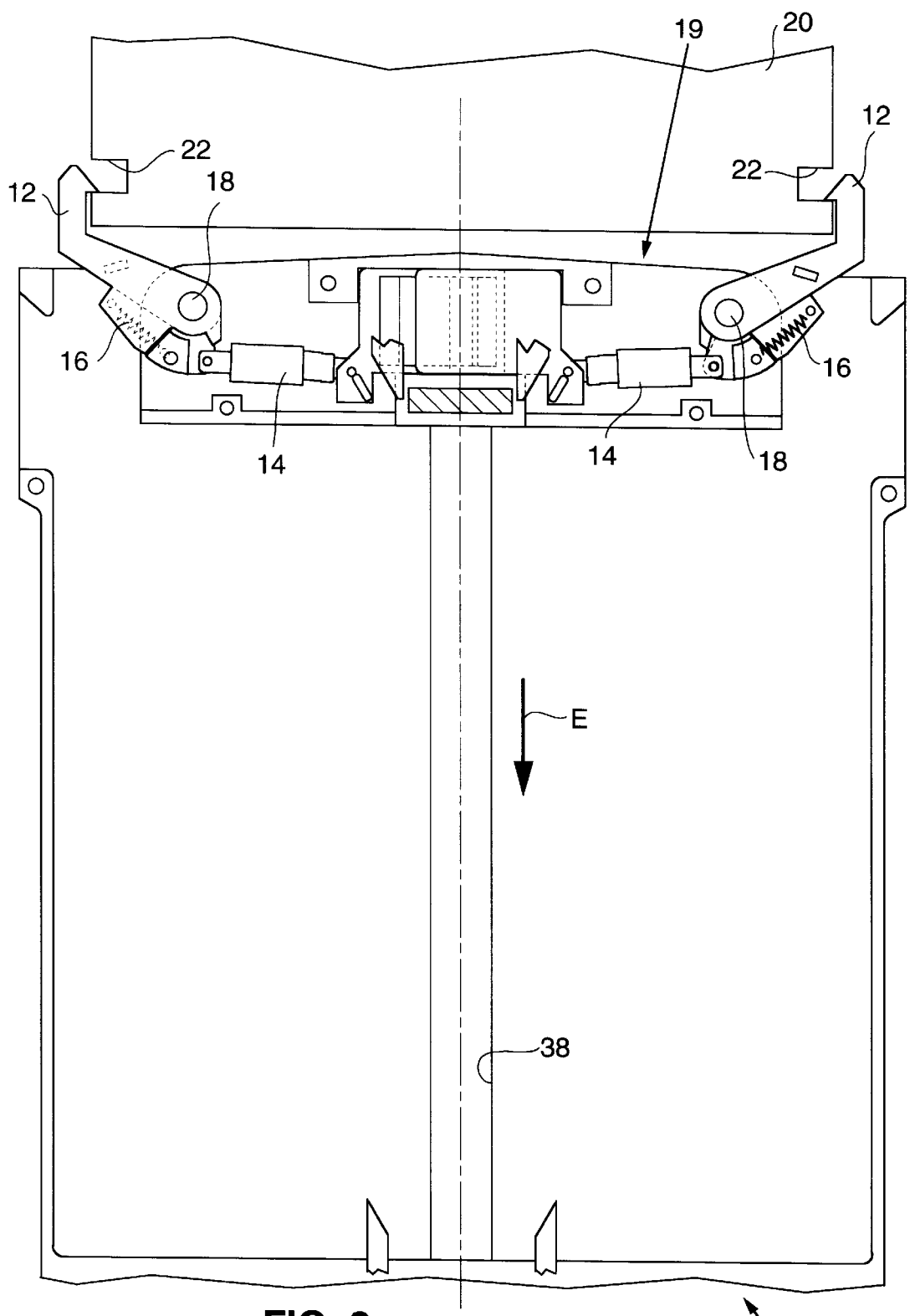
FIG. 2 shows a second embodiment of a horizontal transport system of a conventional jukebox, wherein gripper arms are being engaged with a cartridge.
Figure 3:
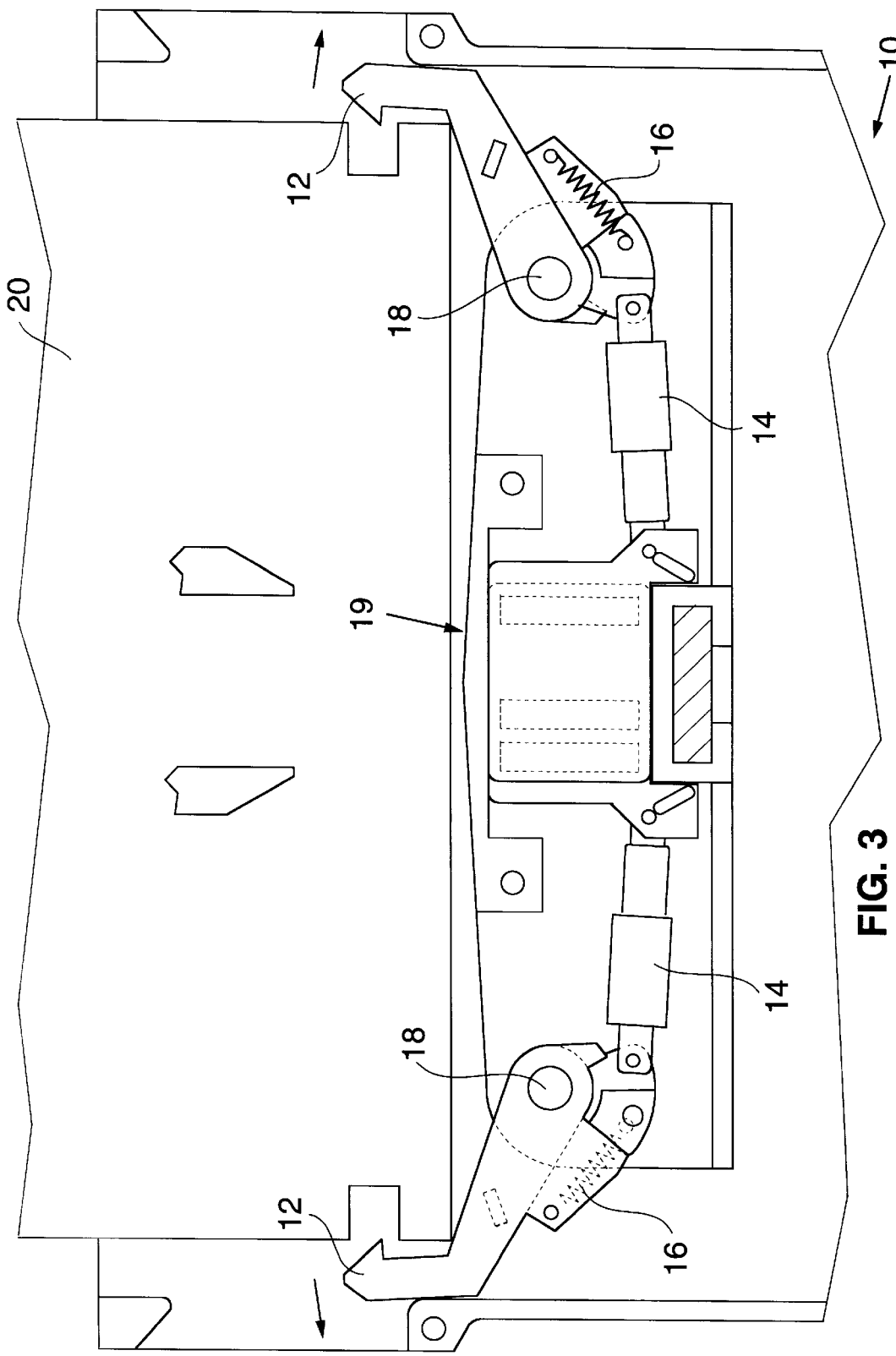
FIG. 3 shows a second embodiment of a horizontal transport system of a conventional jukebox, wherein gripper arms are being disengaged from a cartridge.
Figure 4:
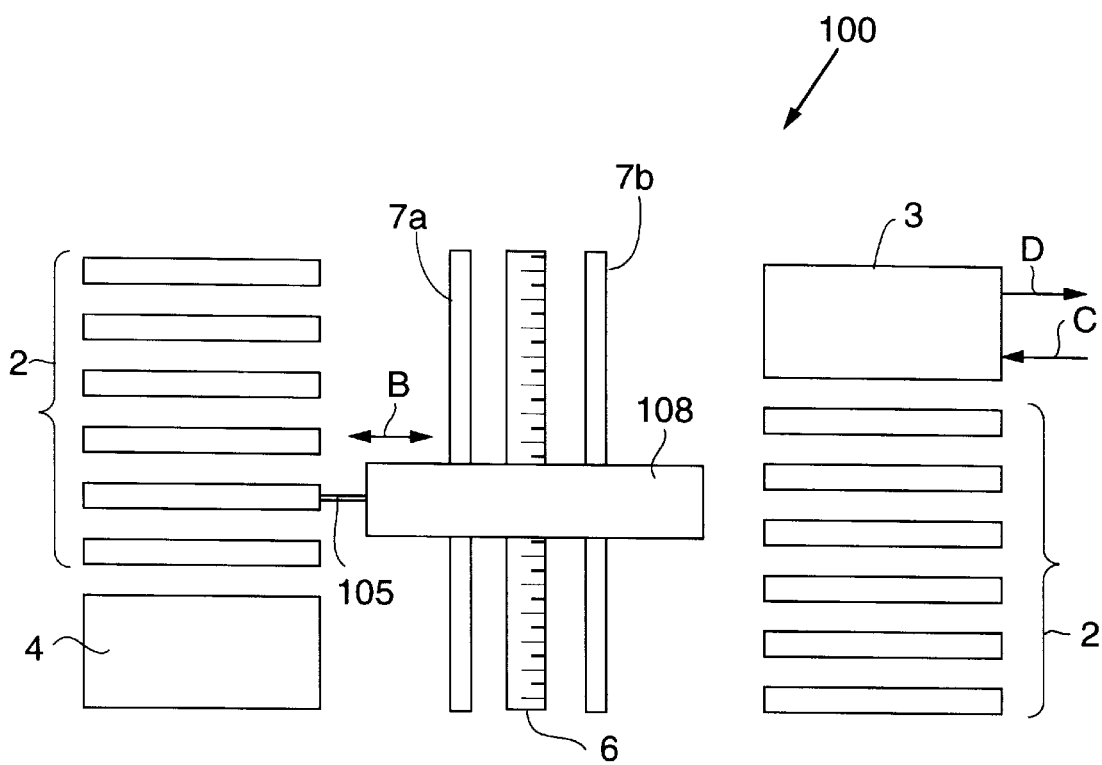
FIG. 4 shows an embodiment of a jukebox according to the present invention.

A preferred embodiment of the present invention will now be described with reference to FIGS. 4–23. FIG. 4 shows a simplified layout of a jukebox 100 into which the transport system of the present invention is incorporated. The jukebox 100 shown in FIG. 4 is somewhat similar to the jukebox 1 shown FIG. 1, wherein common reference numerals denote common features, and these common features are not further discussed herein.

Figure 5:
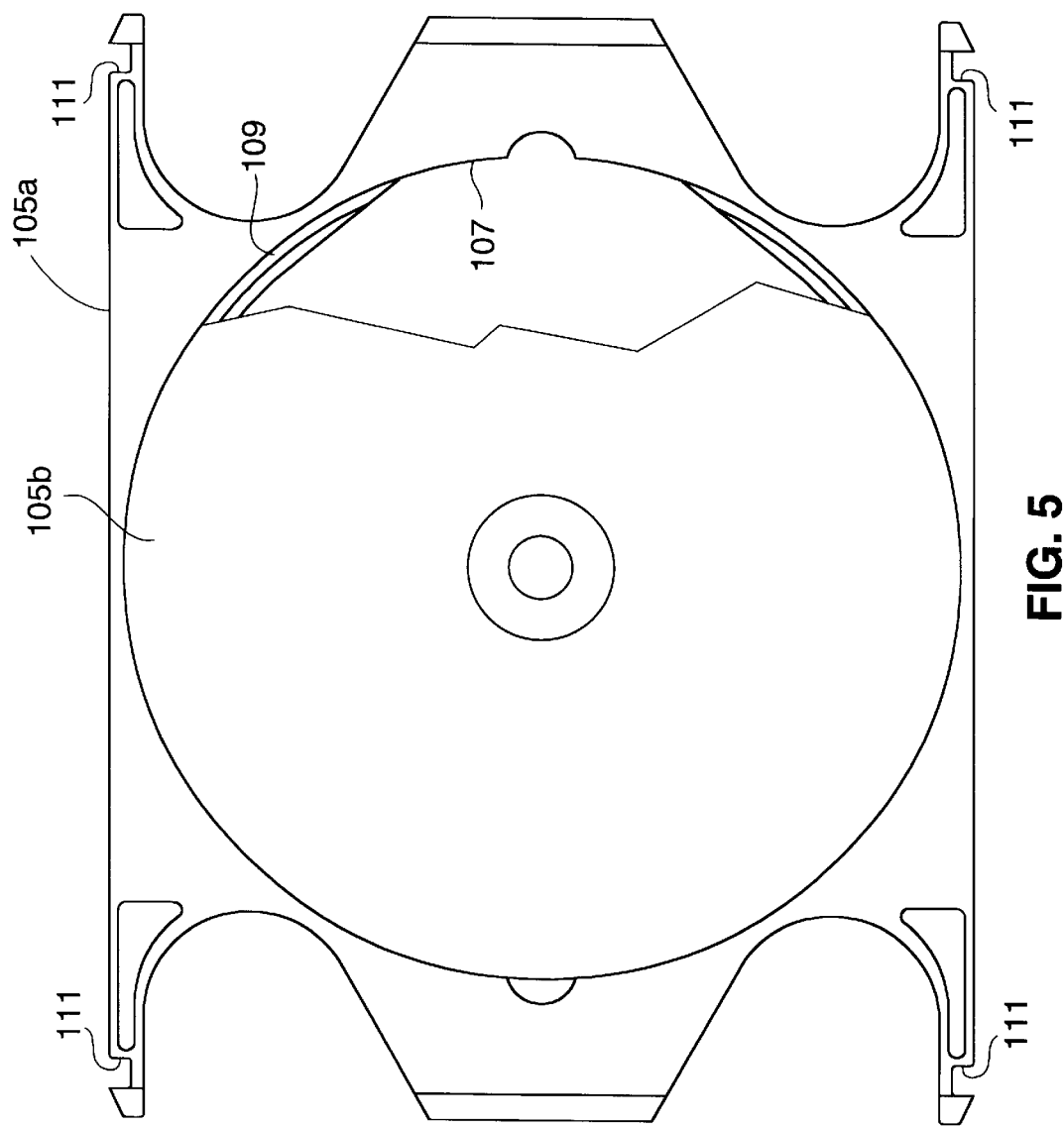
FIG. 5 shows a recording medium assembly according to the present invention.

As shown in FIG. 5, the recording medium assembly 105 includes a tray 105a and a recordable disc 105b. The recordable disc 105b may be a compact disc, a CD-ROM, an optical disc, etc. The recordable disc 105b may hold recorded audio data, video data, computer program data, blank discs, etc. Currently, many such recordable discs 105b are 12 centimeters in diameter, but other sizes are possible. It is also noted that other types of recording medium assemblies are possible, such as cartridge assemblies which require no trays.

A tray 105a can hold one disc 105b. More specifically, the disc is laid into central aperture 107, resting on lip 109. As long as the tray 105a is maintained in a substantially horizontal position, gravity will generally keep the disc 105b in the tray 105a. However, according to the present invention, there may be further means in the carriage 108 (discussed further below) for securing the disc 105b within the tray 105a during horizontal transport. The tray also has notches 111 to help effect horizontal transport.

Before the jukebox 100 is loaded with recordable discs 105b, it is empty and each shelf 2 generally holds an empty tray 105a. Then, when a recordable disc 105b is to be delivered via the delivery/eject assembly 3, the carriage 108 receives an empty tray 105a from one of the shelves 2. The carriage 108 receives the tray using the horizontal (direction of double arrow B) transport system of the present invention. When the carriage has an empty tray 105a, the carriage 108 travels in the vertical direction (double arrow A) to the eject/delivery assembly 3, where it feeds the empty tray 105a to the delivery/eject assembly 3.

The eject/delivery assembly 3 allows an operator to place the disc 105b in the tray 105a to complete the recording medium assembly 105. The recording medium assembly 105 is then retrieved by the carriage 108, using the horizontal (direction of double arrow B) transport system of the present invention. The carriage can then travel in the vertical direction in order to place the recording medium assembly 105 on the appropriate shelf 2 for storage, or to feed the recording medium assembly to the disc drive 4 for immediate reproduction and/or recording.

Delivery of discs can be repeated until all of the shelves 2 have a recording medium assembly 105 with a disc 105b. Discs 105a may also be removed from the jukebox 100 via the delivery/eject assembly 3. Each time an empty tray 105a or a recording medium assembly 105 is transported between a shelf 2 and either the delivery/eject assembly 3 or the disc drive 4, the tray 105a must generally be transported in the horizontal direction (onto and off of the carriage 108), and in the vertical direction.

Figure 6:
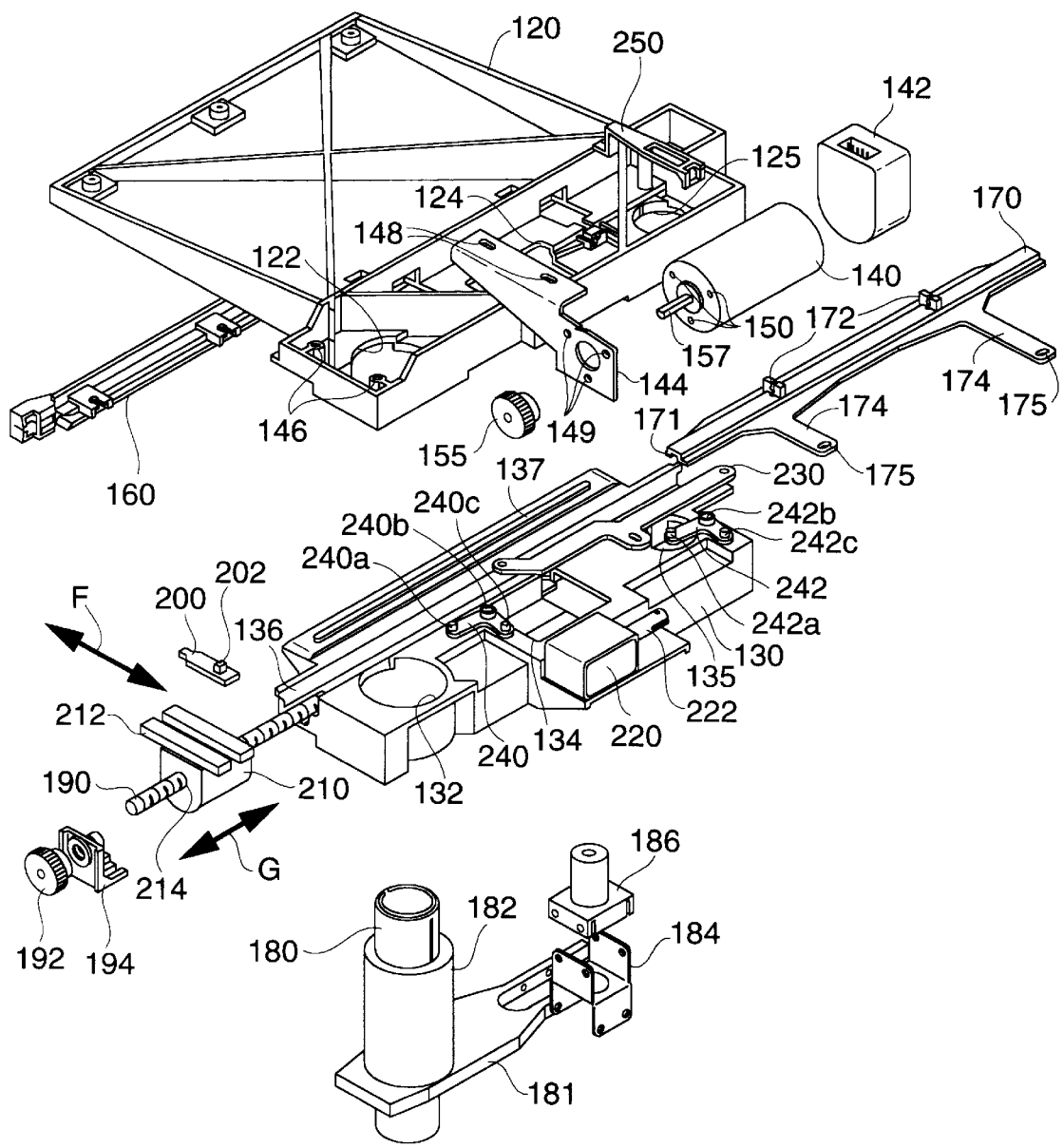
FIG. 6 shows an exploded perspective view of a carriage assembly according to the present invention.
Figure 7:
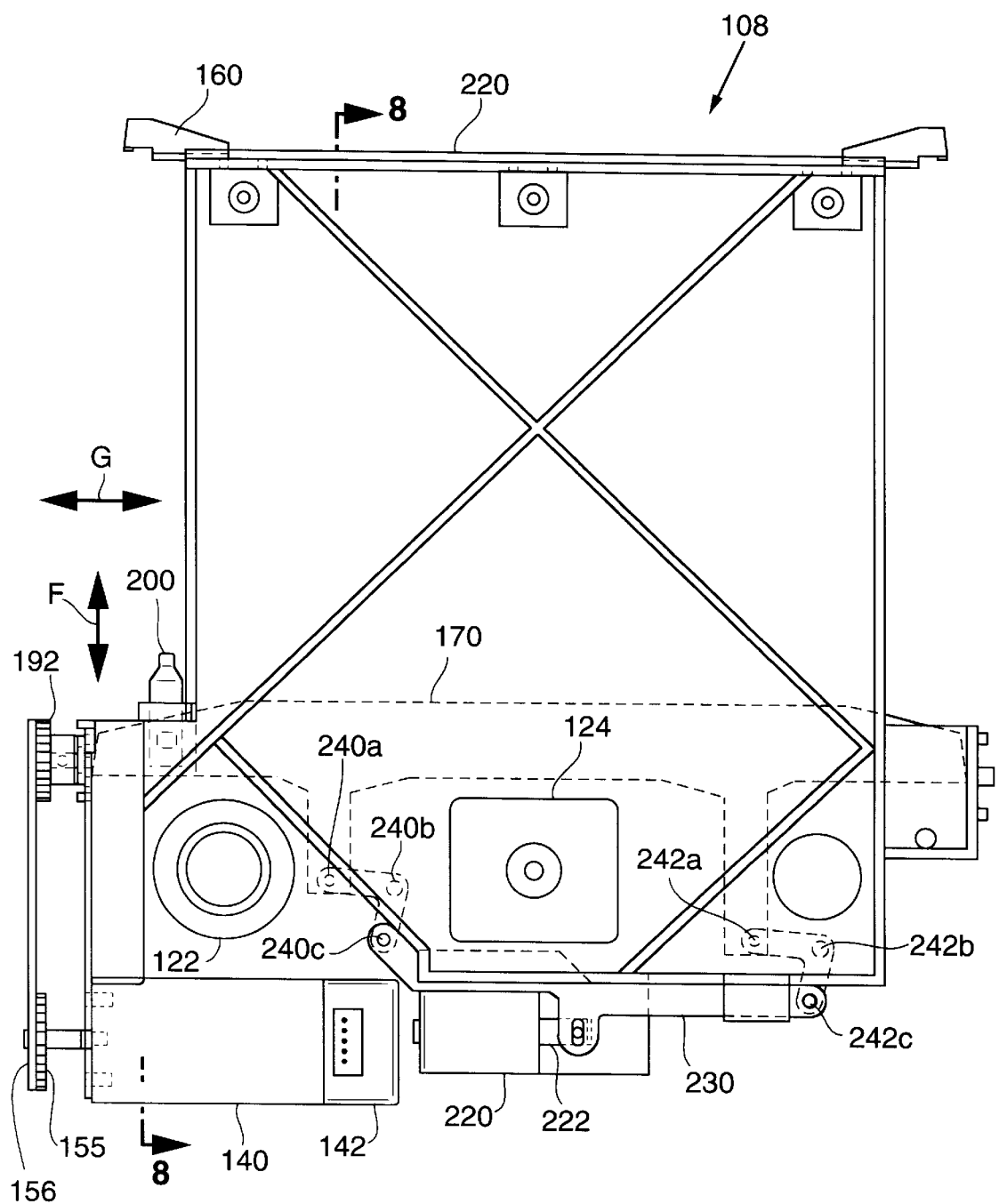
FIG. 7 shows a top view of a carriage assembly according to the present invention.
Figure 8:
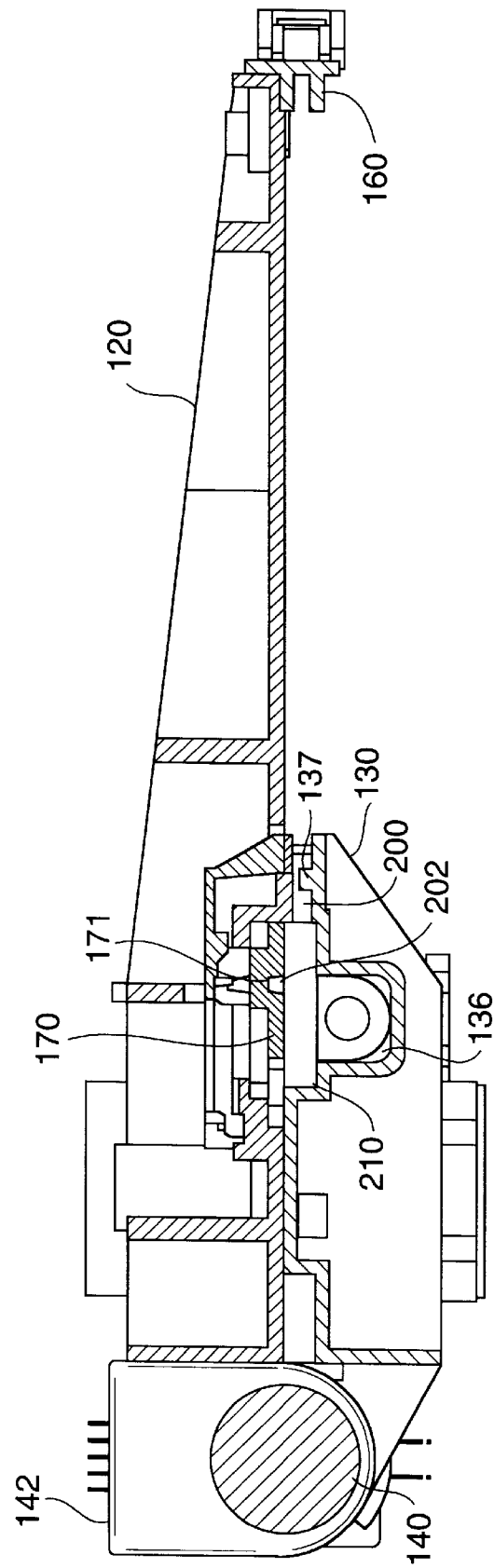
FIG. 8 shows a cross-sectional side view of a carriage assembly according to the present invention.

The vertical transport can be effected by conventional vertical transport systems and will not be discussed in great detail herein. In order to effect the horizontal transport, the carriage 108 is equipped with a horizontal transport system according to the present invention, which will be further described below with reference to FIGS. 6–8. FIG. 6 shows an exploded view of some components of a carriage 108 according to the present invention. FIG. 7 shows a top view of the carriage assembly which is under the carriage top 120, shown by dashed lines. FIG. 8 shows a side cross-sectional view of the carriage assembly 108.

The body of the carriage includes carriage top 120 and carriage bottom 130. The carriage 120 top includes circular aperture 122, rectangular aperture 124, and an elongated aperture 125. Likewise, the carriage bottom 130 includes circular aperture 132, rectangular aperture 134, and an elongated bearing aperture 135 which are respectively aligned with the circular aperture 122, the rectangular aperture 124, and the elongated aperture 125.

Bracket 181 is secured to the carriage bottom 130 by several screws (not shown). Bracket 181 is secured to sleeve 182 and flexure 184. Sleeve 182 holds bearing 180. Flexure 184 is secured to the nut 186.

The flexure 184 and nut 186 pass through the aligned rectangular apertures 124, 134 when the carriage 108 is assembled. When the carriage 108 is assembled into the jukebox 100, threaded post 6 passes through the threaded hole 187 in the nut 186. Then, by rotating the threaded post 6 about its central axis, the entire carriage 108 can be driven in the vertical direction by the engagement between the nut 186 (which is fixed to the carriage 108) and the rotation of threaded post 6.

The exact vertical positioning and calibration is controlled by conventional methods and means, such as precisely controlling the rotation of the threaded post 6 and/or by optical position detection built into the carriage and jukebox 100.

Sensor assembly 160 is disposed along an edge of the carriage top 120 as shown in FIGS. 6–7. The sensor assembly 160 has optical sensors for sensing points on the jukebox 100 (such as the various shelves 2) to help determine the vertical position of the carriage 108 relative to the jukebox 100.

Bearing 180 passes through the aligned circular apertures 122, 132. When the carriage 108 is assembled into the jukebox 100, second post 7a passes through the bearing 180. The engagement between the second post 7a and the bearing 180 allows the carriage 108 to move stably in the vertical direction. Third post 7b passes through the aligned apertures 125 and 135. The elongated aperture 135 in the carriage bottom has a bearing surface to provide for smooth vertical motion of the carriage 108. The two bearings, bearing 180 and bearing aperture 135, prevent rotation of the carriage 108 in the horizontal plane. The elongated apertures 125, 135 are elongated to allow some 'play' in the radial direction which allows for smoother vertical movement of the carriage 108.

According to this arrangement, the carriage top 120 and carriage bottom 130 do not move in the horizontal direction (shown by double arrow G in FIG. 6), because the carriage top and bottom are restrained from moving in this direction by the threaded post 6 and the second post 7. Instead, recording medium assemblies are moved into and out of the carriage 108 by horizontal movement of a transport nut 210 and a transport engagement piece 200, as explained below.

A groove 136 in the carriage bottom 130 contains a threaded worm screw 190. A threaded hole 214 of transport nut 210 is engaged with the threads of the worm screw 190. When the worm screw 190 is driven to rotate about its central axis, the transport nut 210 moves in the horizontal direction within the groove 136. Therefore, when a recording medium assembly 105 is engaged (as further explained below) with the transport nut 210, the recording medium assembly 105 is driven in the horizontal direction into or out of the carriage 108.

The worm screw 190 is rotated by motor 140. Motor 140 is secured to bracket 144 by means of aligned holes 149, 150. The bracket 144 is in turn secured to the carriage top 120 by aligned holes 146, 148. The motor 140 drives its spindle 149 into rotation. This drives gear 155 which is attached to the spindle 149. Gear 155 is engaged with gear 192 by a toothed pulley 156 (see FIG. 7). Rotation of gear 155 drives the toothed pulley to rotate gear 192.

Gear 192 is attached to an end of the worm screw 190, and the worm screw 190 can thereby be driven to rotate by the motor 140, via spindle 149, gear 155, a toothed pulley and gear 192. The end of the worm screw 190 is secured to the carriage bottom 130 at its end by bearing 194.

There is a rotary encoder 142 attached to the motor 140. The rotary encoder 142 detects the number of rotations in the motor 140 in order to help control the rotation and calibration of the positions of the worm screw 190 and the transport nut 210.

Figure 15:
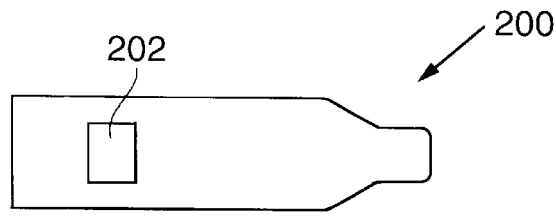
FIG. 15 shows a top view of an engagement piece.
Figure 16:
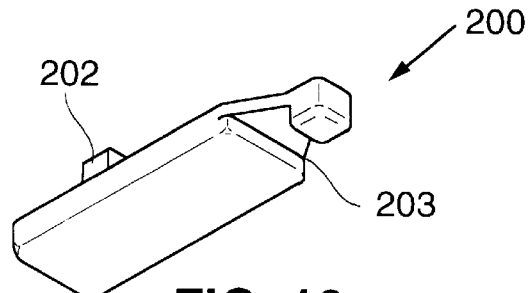
FIG. 16 shows a perspective view of an engagement piece.
Figure 17:
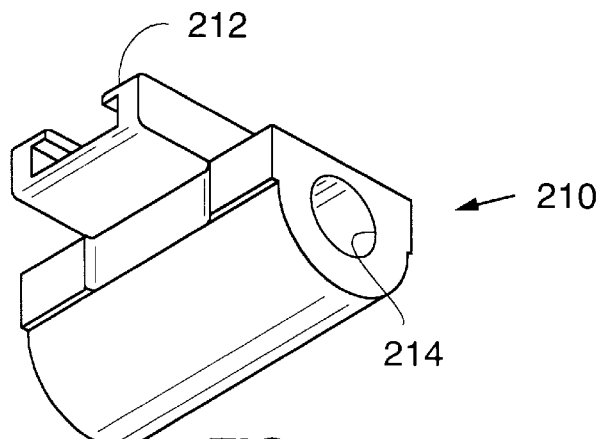
FIG. 17 shows a perspective view of a transport nut.
Figure 18:
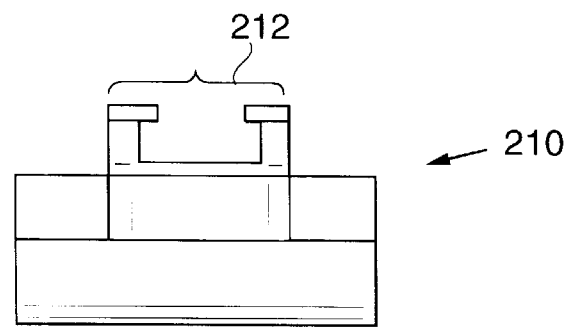
FIG. 18 shows a side view of a transport nut.

The engagement piece 200 is slidably engaged with the guide portion 212 transport nut 210 so that the engagement piece 200 can be moved in a direction (shown by double arrow F) perpendicular to the horizontal direction G. The engagement piece 200 is shown in FIGS. 15 and 16. The transport nut is shown in FIGS. 17 and 18. More specifically, the engagement piece 200 moves relative to the transport nut 210, in the direction shown by double arrow F, between an engagement position and a disengagement position as further explained below.

Figure 9:
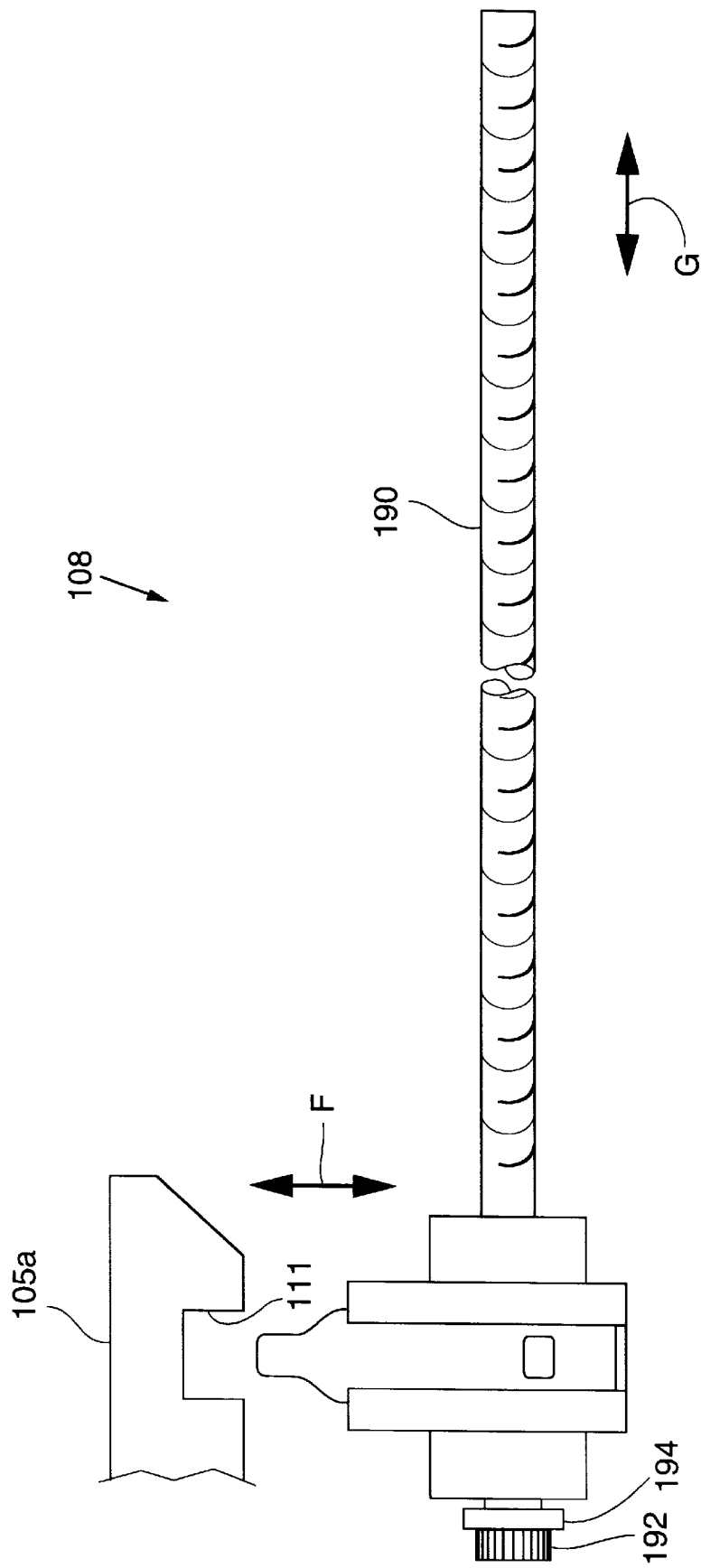

FIGS. 9–14 show how a tray is engaged and transported in the horizontal direction G by the transport nut 210 and the engagement piece 200. In FIG. 9, the transport nut 210 and engagement piece have been moved by rotation of the worm screw 190 into the vicinity of a tray 105a on a cartridge shelf 2. However, the engagement piece 200 is in the disengagement position, and is therefore not yet engaged with the tray 105a.

Figure 10:
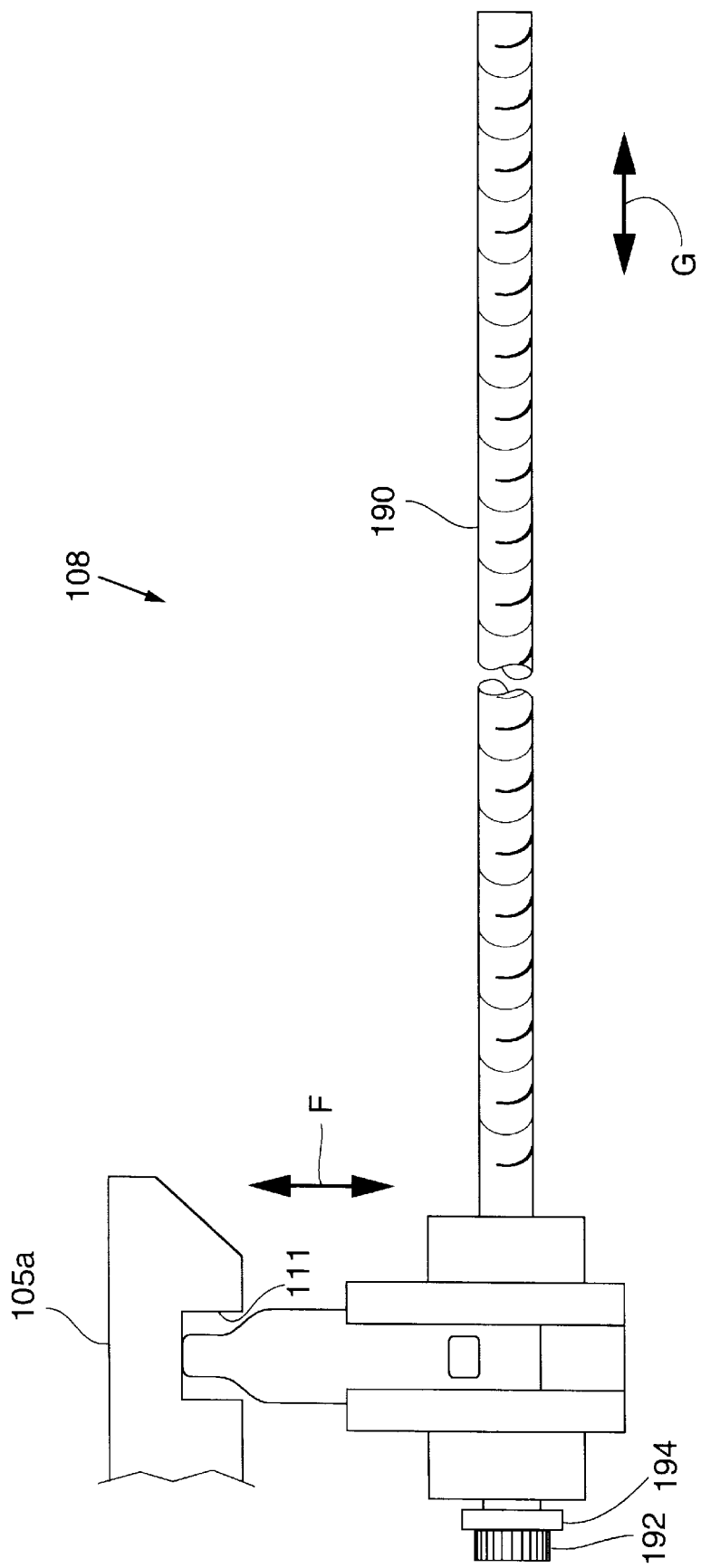

As shown in FIG. 10, the engagement piece 200 is then moved (as further explained below) in the direction of the arrow F to the engagement position so that it engages notch 111 on tray 105a.

Figure 11:
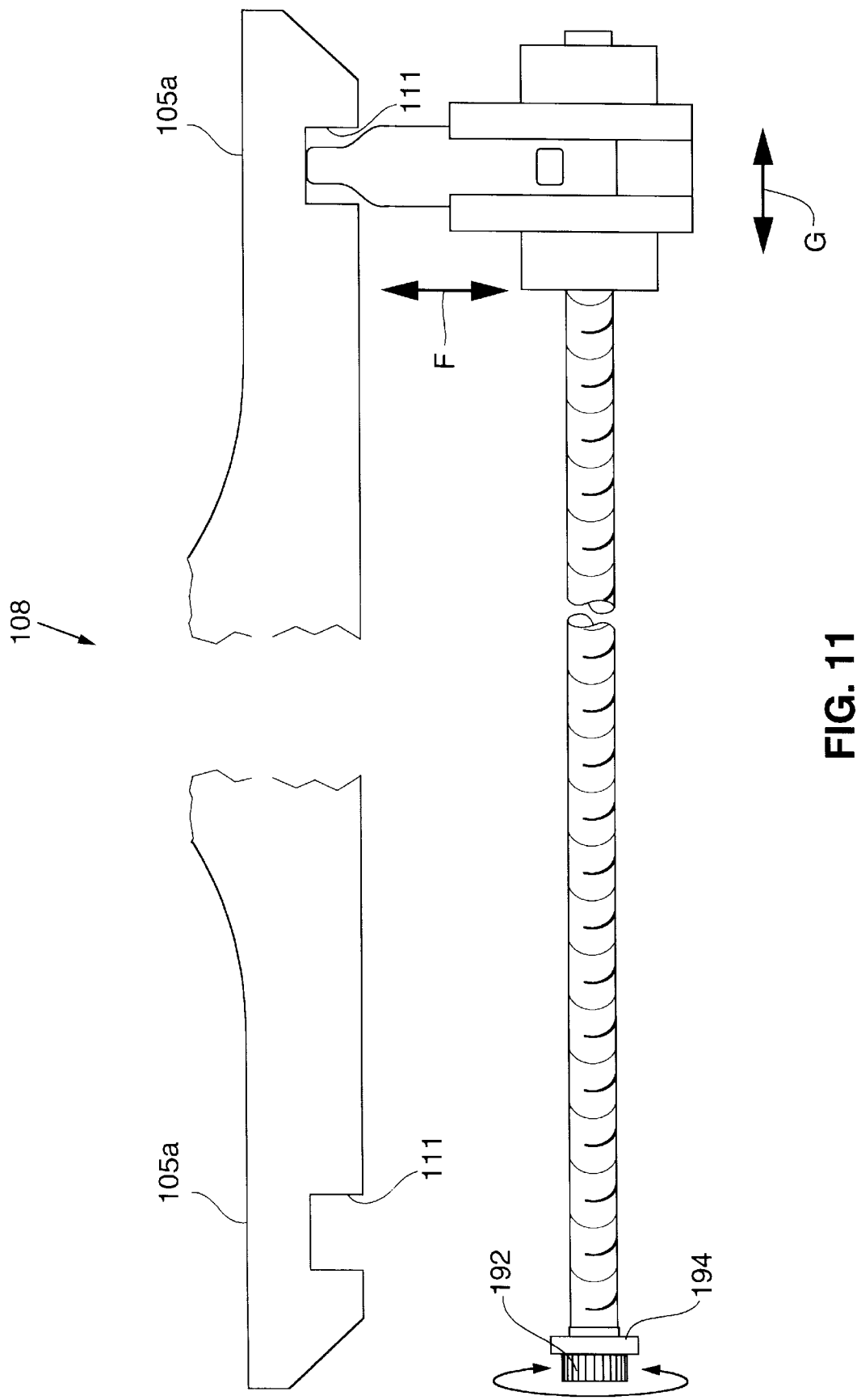

After the tray is engaged as shown in FIG. 10, the worm screw 190 is rotated so that the transport nut 210 and the engagement piece 200 move in the horizontal direction back into the carriage 108, as shown in FIG. 11. This pulls the tray 105a in the horizontal direction G back into the carriage 108 so that the tray 105a can be transported in the vertical direction, e.g., to another shelf 2, to the delivery/eject assembly 3, or to the disc drive 4.

Figure 12:
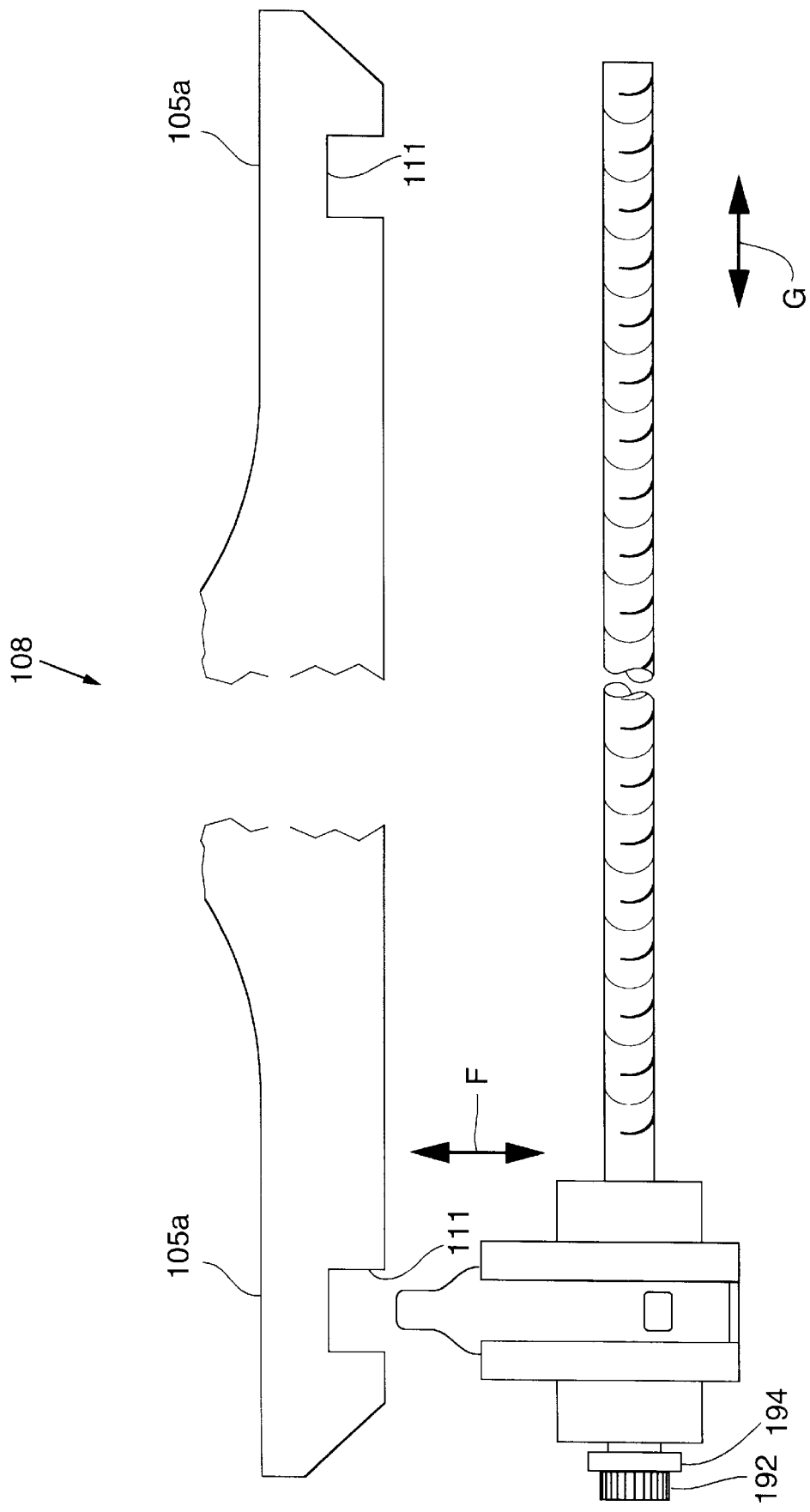

In FIG. 12, the engagement piece 200 has been moved in direction F back into the disengagement position and then the engagement piece 200 and transport nut 210 have been moved back to the left side of the carriage 108 by rotation of the worm screw 190. Of course, the tray 105a does not move to the left with the engagement piece 200 and transport nut 210 because the engagement piece 200 is no longer engaged with the notch 111 of the tray 105a. In FIG. 12, the transport nut 210 has been moved into the vicinity of another notch 111 of tray 105a.

Figure 13:
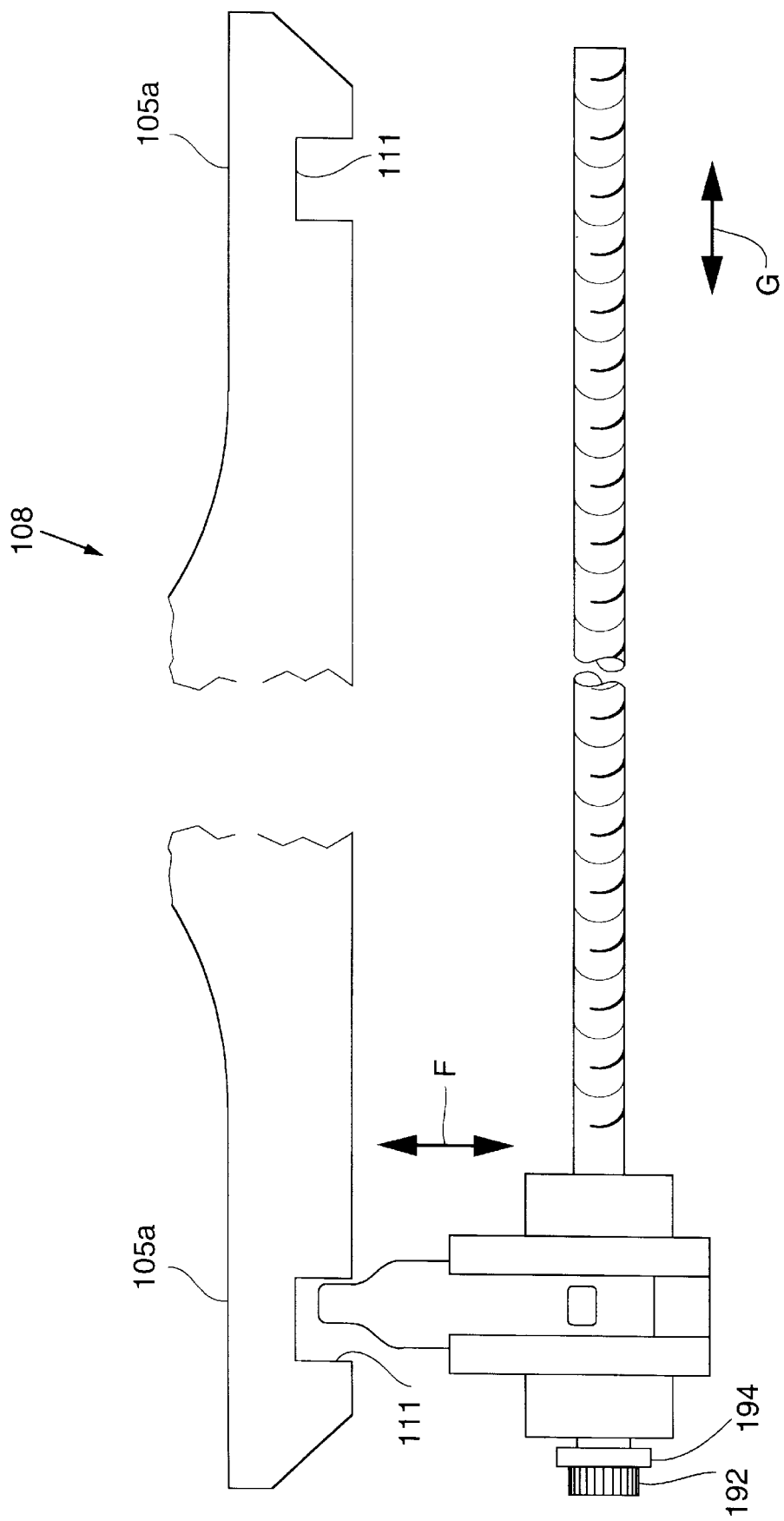

In FIG. 13, the engagement piece 200 is moved in the direction F back into the engagement position. This time the engagement piece 200 engages a different notch 111 of the tray 105a.

Figure 14:
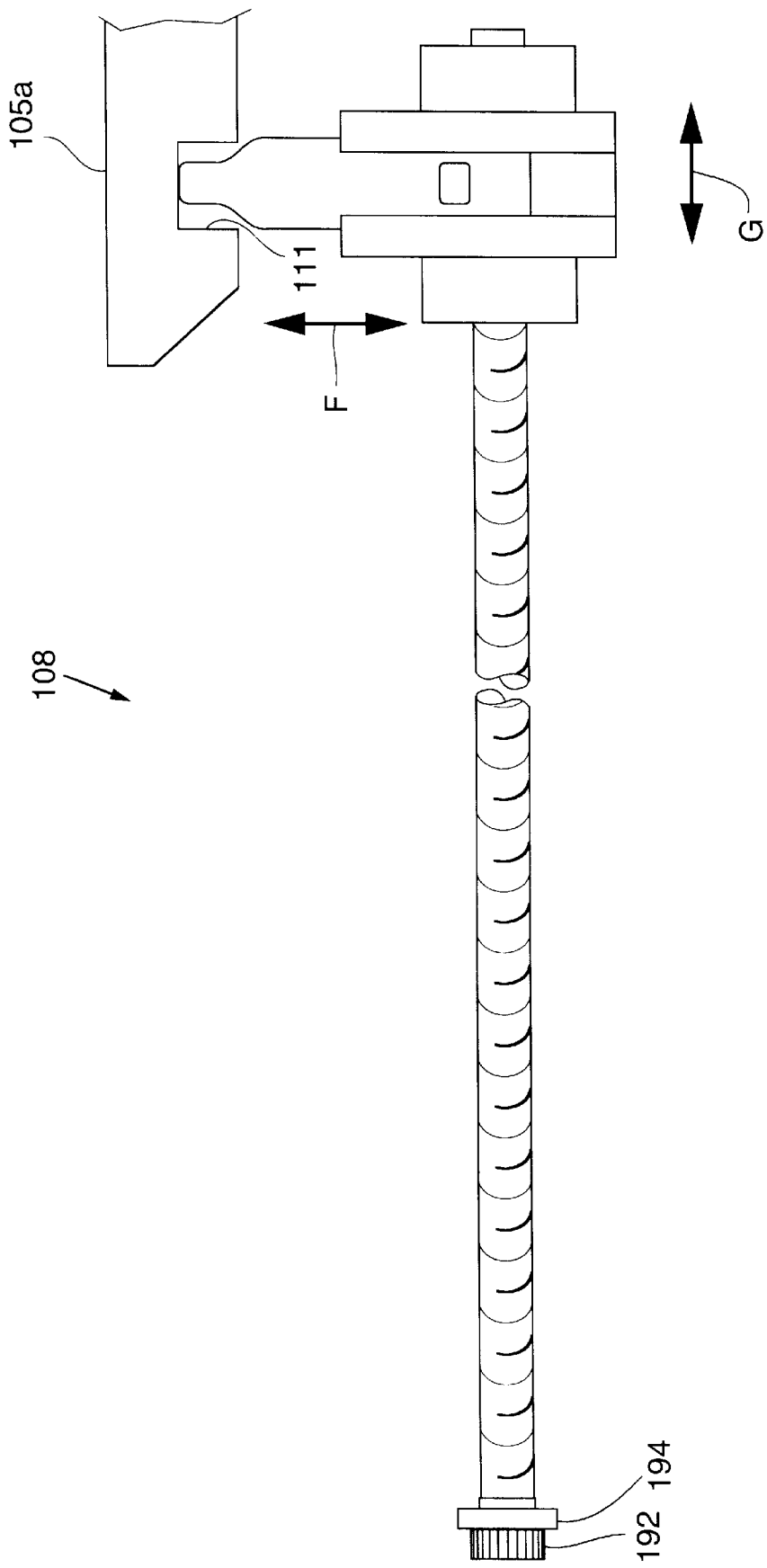

As shown in FIG. 14, the worm screw 190 is rotated to transport the transport nut 210, the engagement piece 200 and the engaged tray 105a in the horizontal direction G, so that the tray 105a is ejected from the right side of the carriage 108, e.g., onto another shelf 2, into the delivery/eject assembly 3, or into the disc drive 4. Although in the example shown in FIGS. 9–14 the tray 105a is moved into the carriage 108 from the left side and out of the carriage 108 to the right side, it should be readily apparent that the transport nut 210 and the engagement piece can be controlled to move a tray 105a into or out of the carriage from either the left or the right side depending on the original location of the desired tray 105a and the desired destination of the tray 105a.

Figure 19:
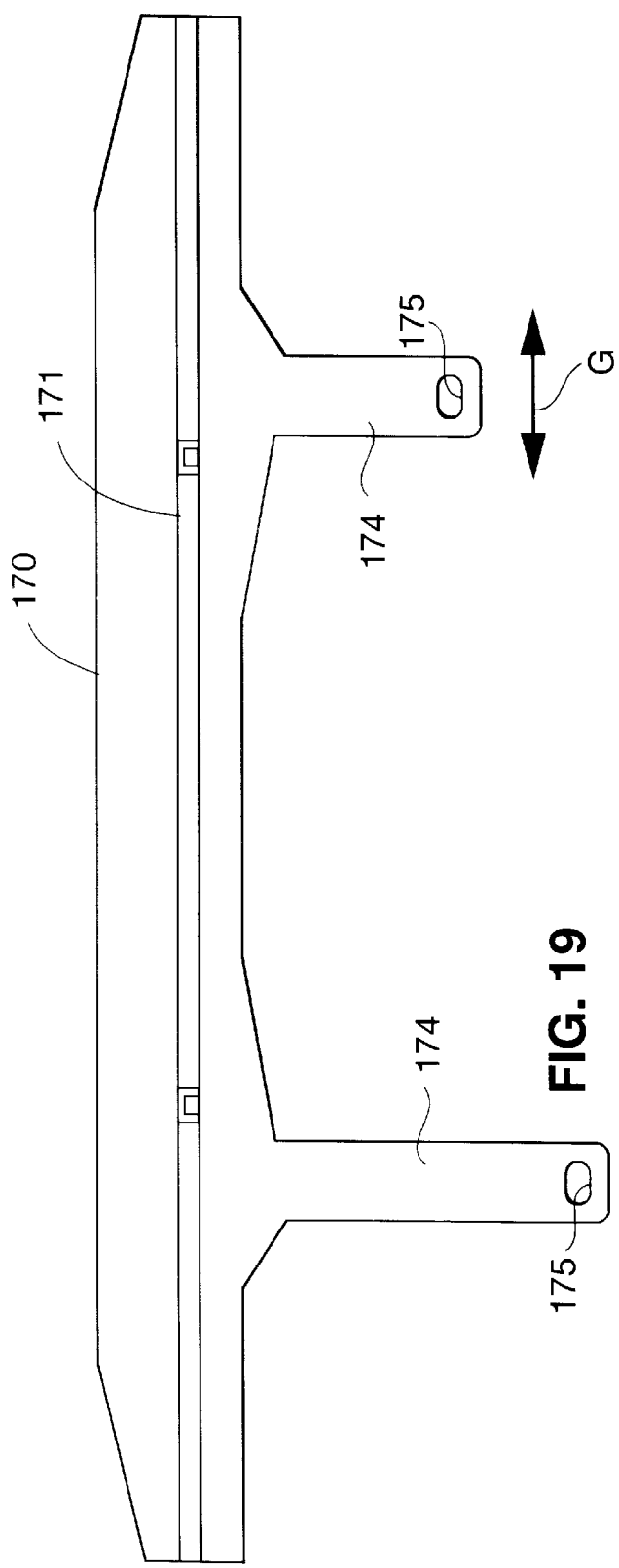
FIG. 19 shows a top view of a link.
Figure 20:
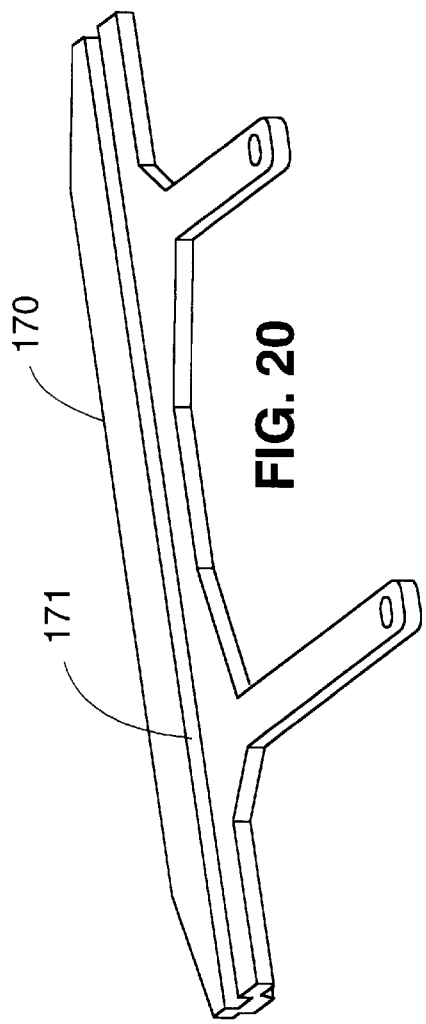
FIG. 20 shows a perspective view of a link.

The actuation of the engagement piece 200 in the direction of arrow F between positions of engagement and non-engagement will now be explained. As shown in FIGS. 6 and 8, link 170 has an elongated groove 171 formed therein. FIGS. 19 and 20 show further views of the link 170 with the groove 171. The groove 171 of link 170 is slidably engaged with a projection 202 on the engagement piece 200. The engagement piece 200 slides relative to the link 170, in the G direction, along the length of the groove 171. Because the engagement piece 200 slides in the G direction, the engagement piece 200 follows the transport nut 210 in the G direction, despite its engagement with link 170.

Figure 21:
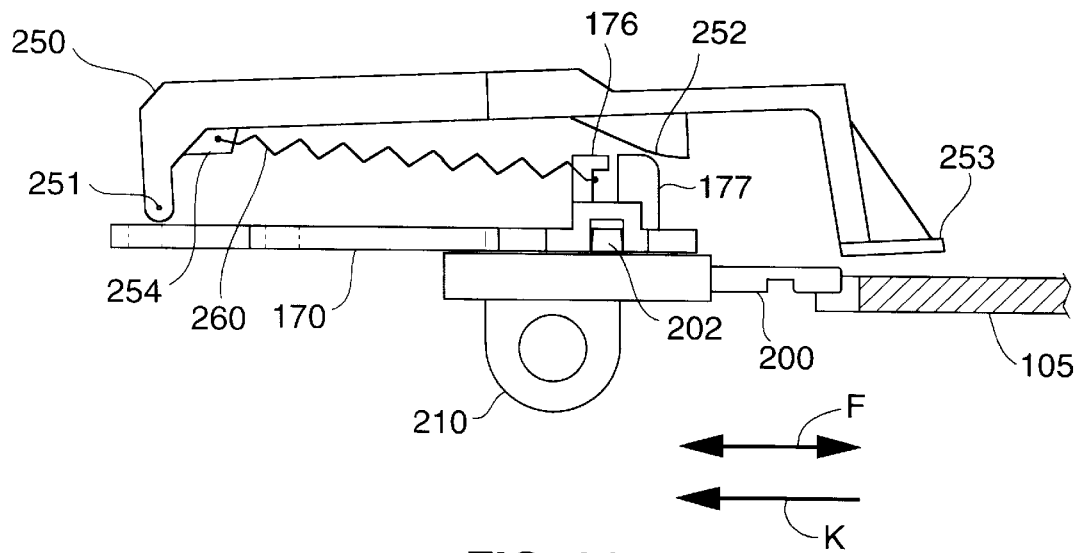
FIG. 21 shows a side view of the transport nut, engagement piece and the link in the engagement position.
Figure 22:
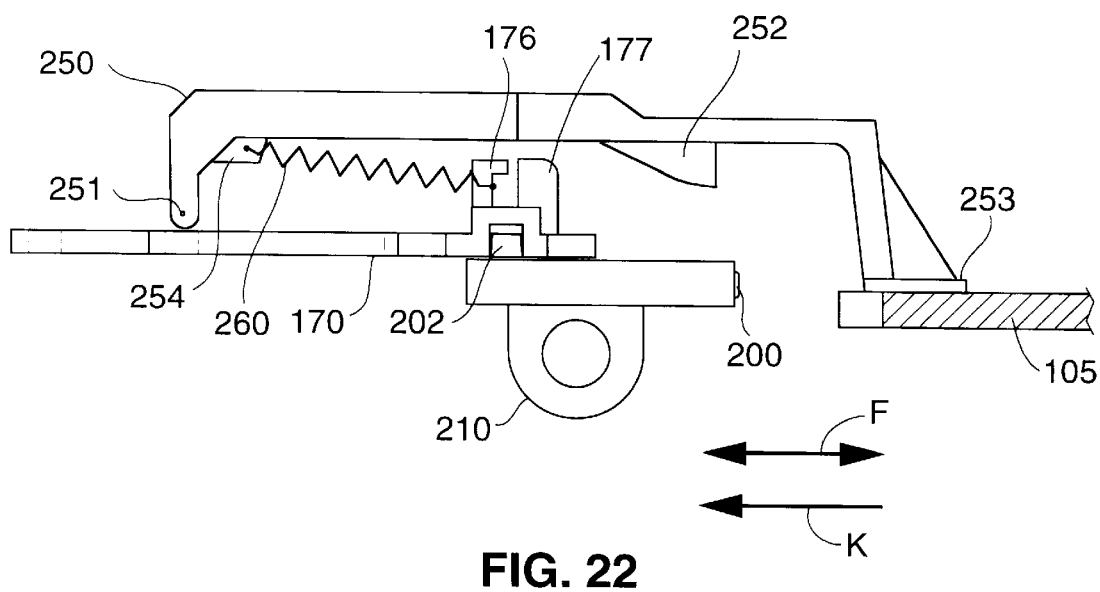
FIG. 22 shows side view of the transport nut, engagement piece and the link in the non-engagement position.

FIGS. 21 and 22 show how link 170 moves the engagement piece 200 in the F direction, between positions of engagement (FIG. 21) and non-engagement (FIG. 22) by the engagement between groove 171 and the projection 202 of the engagement piece 200. As shown in FIG. 21, in the engagement position, the engagement piece 200 protrudes by a relatively long distance from the transport nut 210, so that a recording medium assembly is engaged by this protruding portion.

When the link 170 slides back in direction K relative to the transport nut 210, the engagement piece 200 will also slide in the direction K relative to the transport nut 210 because of the engagement between the groove 171 and the projection 202. In the disengagement position, the engagement piece 200 protrudes very little (or not at all) from the transport nut 210. For this reason, the transport nut 210 is then free to move in the direction G without taking along a recording medium assembly.

Link 170 also has two arms 174, which are perpendicular to the groove 171. (See FIGS. 19 and 20.) Each arm has a slot 175. The slots 175 are slightly elongated in the G direction.

Figure 23:
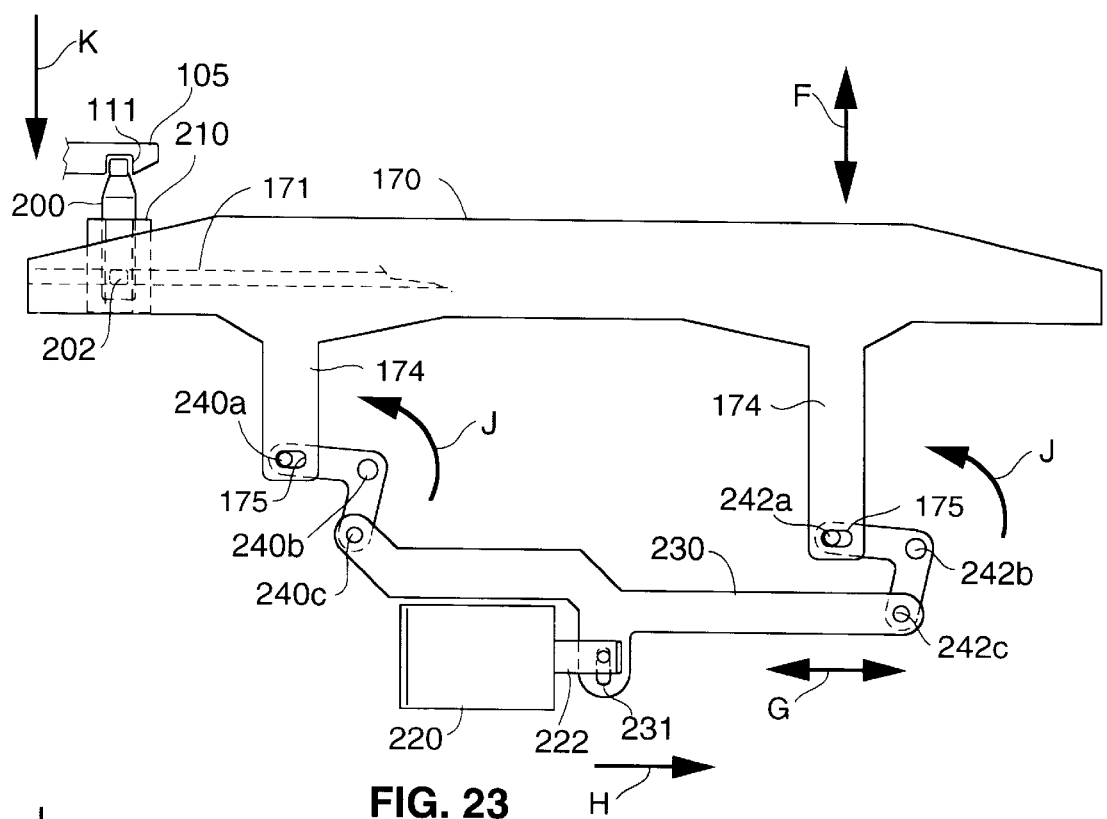
FIG. 23 shows a top view of selected components of the carriage in a position of engagement.
Figure 24:
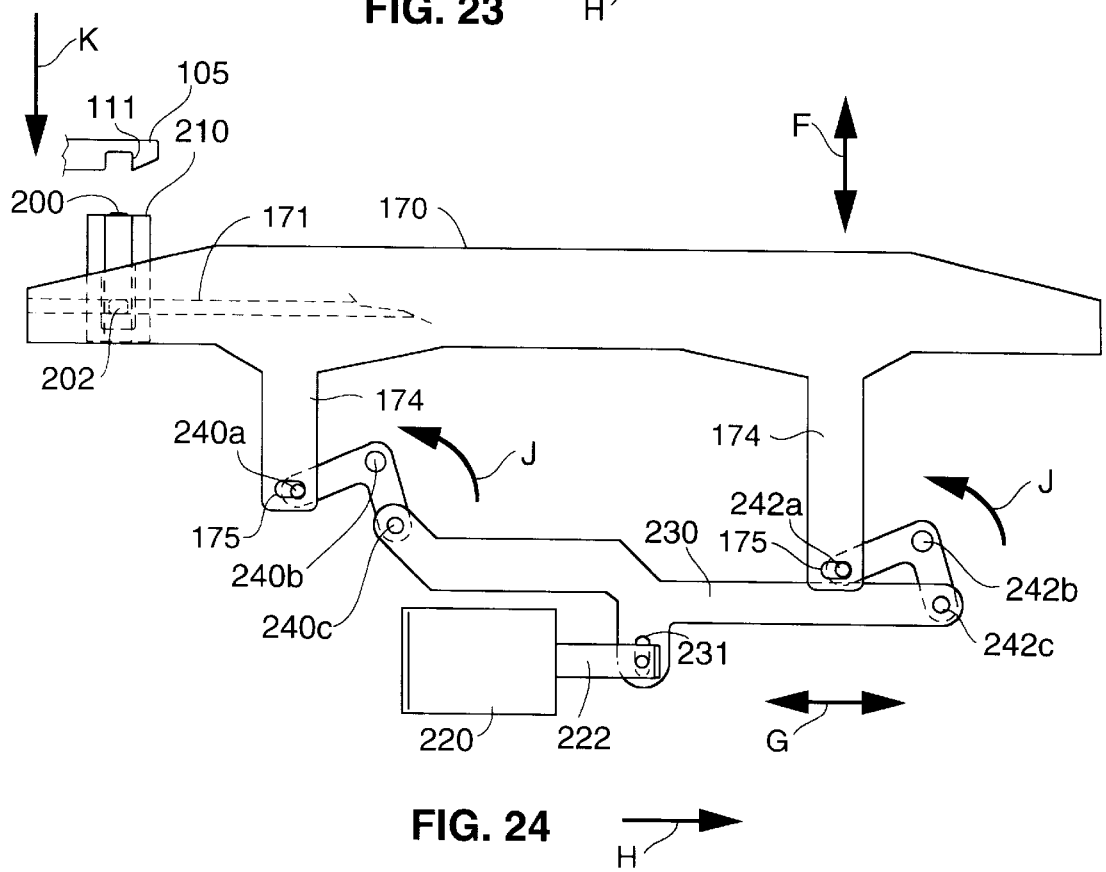
FIG. 24 shows a top view of selected components of the carriage in a position of non-engagement.

The motion of link 170, which drives the engagement piece 200 between positions of engagement and non-engagement will now be described with reference to FIGS. 23 and 24. FIG. 23 shows components of the carriage 108 when the engagement piece 200 is engaged with notch 111 of a recording medium assembly 105. FIG. 24 shows these components after the engagement piece 200 has been disengaged with the notch 111.

In order to move the link 170 and engagement piece in the K direction from an engagement position to a non-engagement position, first the armature 222 of solenoid 220 is allowed to move in the H direction to an extended position. This drives link 230 in the H direction because the end of armature 222 is engaged with link 230.

It is noted that solenoid armatures are generally actuated in one direction only, either into or out of solenoid. Therefore, the horizontal transport assembly should generally be biased in a direction opposite to the solenoid armature actuation direction. For example, the solenoid of the present invention can be actuated into the solenoid 220 in the counter H direction. Therefore, the horizontal transport assembly of this embodiment is biased toward the position shown in FIG. 24 wherein the armature is extended and the engagement piece 200 is in the non-engagement position. This biasing is provided by a spring 260 which is connected to link 170 and clamp 250. (See FIGS. 21 and 22.) The spring 260 provides a biasing force on link 170 in the K direction (non-engagement position).

Figure 26:
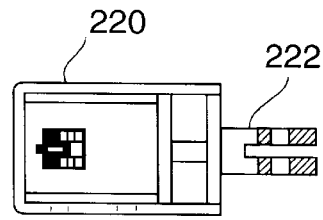
FIG. 26 shows side view of a solenoid actuator.

The solenoid 220 is shown in FIG. 26. The solenoid is fixed to the carriage bottom by screws (not shown). The solenoid 220 is a latching (or bi-stable) solenoid. A small pulse of current in the reverse direction releases armature 222. More specifically, with latching solenoid 222, a relatively small amount of current in the reverse direction (reverse direction from the actuating current direction) negates the field of a permanent magnet in the solenoid and the armature 222 may then be freely withdrawn from the solenoid 220 in the H direction.

Figure 25:
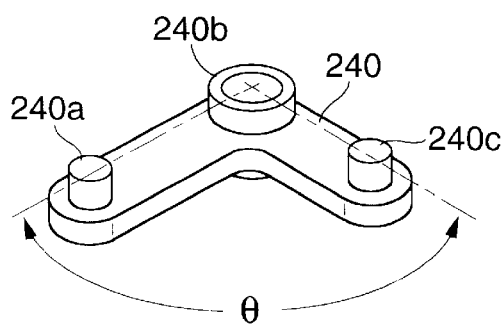
FIG. 25 shows a perspective view of a crank.

Link 230 also engages with second attachment points 240c, 242c of bell cranks 240, 242. A perspective view of bell crank 240 is shown in FIG. 25. Because link 230 is driven in the H direction, this causes the bell cranks 240, 242 to rotate in the J direction about their respective pivot points 240b, 242b. It is noted that the second attachment points 240c, 242c and the link 230 actually follow a path which is arcuate about pivot points 240b, 242b. The F direction component of this arcuate motion is not transmitted back to the armature 222 of solenoid because link 230 is engaged with armature 222 by a slot elongated in the F direction, which allows some relative motion in the F direction between the link 230 and the armature 222.

Because the bell cranks 240, 242 are rotated in the J direction, first attachment points 240a, 242a move in a J direction arcuate path about their respective pivot points 240b, 242b. The first attachment points pull back engaged link 170 in the K direction. Note that the G direction component of the arcuate motion of the first attachment points 240a, 242a is not transmitted the link 170 because the link 170 is engaged with the first attachment points 240a, 240b by slots 175 elongated in the G direction. This allows some relative motion in the G direction between the first attachment points 240a, 242a and the link 170.

To help insure that the link 170 travels substantially along the F direction when driven by the arcuate motion of the cranks 240, 242, guide grooves (not shown) are formed in the carriage top 120 which constrain the arms 174 of the link 170 so that link 170 can move in the F direction only, and so that the G component of the motion of the cranks 240, 242 is reliably taken up in the slots 175.

Because the link 170 is pulled back in the K direction by rotation of the first attachment points 240a, 242a, the engagement piece is likewise pulled back in the K direction by the engagement between groove 171 and the projection 202 of engagement piece 200. (See FIGS. 21 and 22.) As shown in FIG. 24, after the engagement piece 200 has been pulled back to a position substantially within the transport nut 210, the engagement piece is disengaged from the notch 111.

The engagement piece 200 can be moved from the non-engagement position (FIG. 24) back into the engagement position (FIG. 23) by actuating the armature 222 of solenoid 220 in the counter-H direction. This drives link 230 in the counter H direction, which drives the bell cranks 240, 242 to rotate in the counter-J direction. The rotation of the bell cranks 240, 242 in the counter-J direction drives the link 170 in the counter-K direction which drives the engagement piece 200 in the counter-K direction so that the engagement piece again extends from the transport nut 210 back into a position of engaging with notch 111 as shown in FIG. 23.

Several features the carriage assembly 108, which has been described above, are discussed below.

First, the engagement piece 200 is moved by motion of armature 222, link 230, bell cranks 240, 242, and link 170. Because armature 222, link 230, bell cranks 240, 242, link 170, and engagement piece 200 have a relatively small mass, the solenoid 220 requires relatively little energy to move between engagement and non-engagement positions.

Second, recording assembly 105 is moved in the horizontal (G direction) merely by rotation of a worm screw 190 and consequent translation of the transport nut 210 and engagement piece 200. Because these are small parts with a relatively small aggregate mass, the motor 140 requires relatively little energy to move the recording medium assembly 105 in the horizontal direction.

Third, because the bell cranks 240, 242 convert the G direction motion of the solenoid armature 222 into perpendicular F direction motion of the engagement piece, the solenoid 220 can be placed in the orientation shown in FIGS. 23 and 24. It is further noted that different embodiments are possible by modifying the angle of the cranks 240, 242. More specifically, by changing the angle Θ (see FIG. 25) between the first attachment points 240a, 242a and the second attachment points 240c, 242c about the pivot points 240b, 242b, the angle between the direction of the motion of the armature 222 (H direction) and the direction of motion of the engagement piece 200 (K direction) will change. Because of this flexibility, the orientation of the solenoid 220 can be optimized depending upon the layout of other components of the carriage assembly by using an appropriate crank angle.

Fourth, the components which effect engagement/disengagement and horizontal motion (i.e., solenoid 220, link 230, cranks 240, 242, link 170, transport nut 210, worm screw 190 and motor 140) are outside of the (G direction) of the recording medium assembly 105 as it is moved across the carriage 108 in the horizontal direction. This means that a cartridge can be moved completely across the carriage from the left column of the jukebox 100 to the right column without interference with these components. In this way, there is no need to have separate sub-assemblies to move cartridges to the right and to the left. Also, there is no need to move components out of the way as a recording medium assembly is transported across the carriage.

Fifth, it is noted that the arms of the crank 240 have different lengths and that the arms of crank 242 have different lengths. That is, the distance from pivot point 240b to first attachment point 240a (the first crank arm) is longer than the distance from pivot point 240b to the second attachment point 240c (the second arm of the crank). This serves to amplify the motion of the armature 222 into a longer motion of link 170 and engagement piece 200. The ratio of crank arm lengths can be varied to provided different relative lengths of motion of the actuating means and the engagement piece.

Sixth, the embodiment described above provides a parallelogram assembly which provides for stable parallel motion of link 170 generated by a single, one point motion in armature 222. Because of this stable parallel motion arms 174 of link 170 can be made relatively short.

Figure 29:
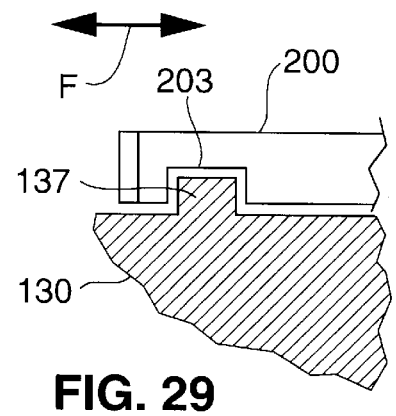
FIG. 29 shows a portion of a carriage bottom and the engagement piece.

As shown in FIG. 6, the carriage bottom 130 includes a ridge 137. As shown in FIG. 29, ridge 137 is sometimes engaged with groove 203 in the engagement piece 200. (FIG. 16 shows groove 203.)

When the engagement piece 200 is in the engagement position (i.e., the position extending from transport nut 210), the groove 203 will engage with the ridge 137. This prevents displacement of the tip of the engagement piece 200 in the F direction.

Of course, when the engagement piece 200 is engaged with the ridge 137, it cannot be moved back in the F direction to the non-engagement position. However, the engagement piece will usually only be required to move from the engagement position to the non-engagement position when the engagement piece 200 is at the extreme left or right positions, to disengage with a recording medium assembly 105 which has been transported into the left or right jukebox column. For example, FIG. 10 shows the engagement piece 200 moved to the engagement position at the extreme left position. Also, FIG. 14 shows the engagement piece 200 at the extreme right position, where it may be moved from the engagement position to the non-engagement position.

At these extreme left and right positions, the engagement piece 200 is respectively beyond the left and right ends of ridge 137. Therefore, the ridge 137 will not interfere with motion of the engagement piece 200 at the extreme let or right positions, where it must move between engagement and non-engagement positions. In this way, ridge 137 provides added F direction stability for the engagement piece 200, without interfering with normal operations.

Figure 27:
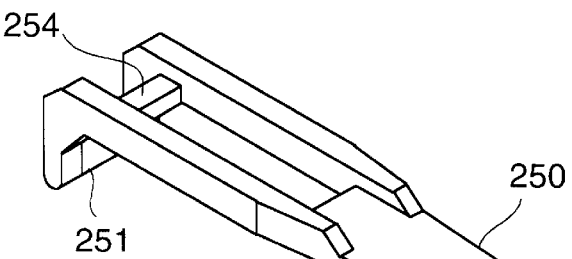
FIG. 27 shows a perspective view of a clamp.
Figure 28:
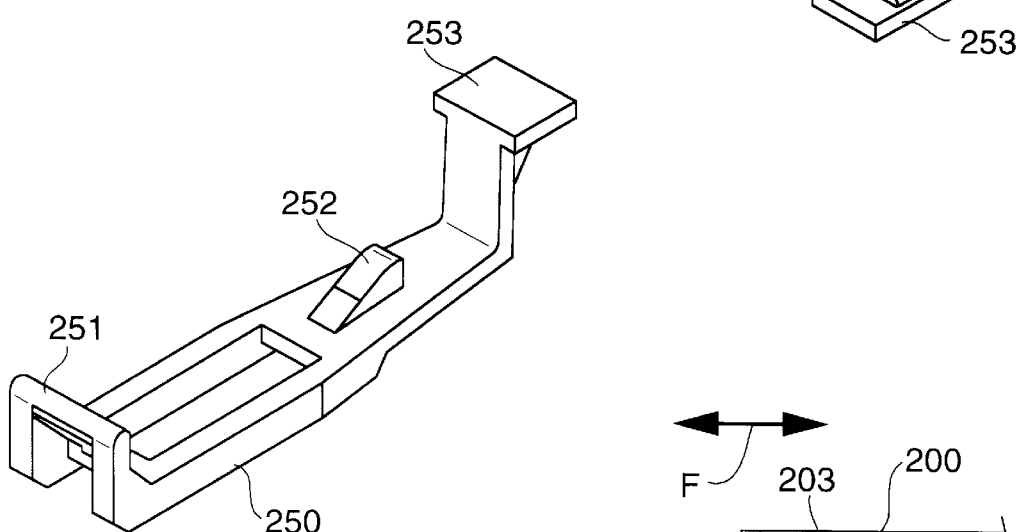
FIG. 28 shows another perspective view of the clamp.

When a recording medium is loaded onto the carriage and the engagement piece 200 is engaged with the notch 111 of a recording medium assembly 105, the engagement helps constrain the recording medium assembly 105 to the carriage 108 despite vibrations which may occur (especially during vertical transport operation. FIGS. 27 and 28 show perspective views of a clamp 250. The clamp 250 may be used with the present invention to help constrain a recording medium assembly 105 to the carriage 108 when the engagement piece 200 is in the non-engagement position and does not help constrain the recording medium assembly 105 to the carriage 108.

The clamp 250 includes a pivot point 251, a camming portion 252, a flat portion 253 and a spring attachment portion 251. As shown by FIGS. 21 and 22, the pivot point 251 is rotatably engaged with the carriage 108 so that the clamp 250 can rotate about the pivot point 251. As shown in FIG. 21, when the engagement piece 200 is in the engagement position, the link 171 is in a position so that projection 177 of the link 170 contacts the camming portion 252 and causes the clamp 250 to rotate about its pivot point 251 in a direction away from the recording medium assembly 105.

As shown in FIG. 22, the engagement piece 200 has been moved into the non-engagement position by motion of link 170 in the K direction. The projection 177 of the link 170 moves in the K direction, away from camming portion 252. The clamp 250 is now free to rotate about its pivot point 251, down into contact with the recording medium assembly 105. More specifically, the flat portion 253 clamps the recording medium assembly down onto the carriage 108. This clamping provides for stable positioning of the recording medium assembly 105, even when the engagement piece 200 is not engaged with the recording medium assembly 105.

In order to increase the clamping force of the clamp 250, a spring 260 is provided to rotationally bias the clamp 250 toward the recording medium assembly 105. The spring 260 is constrained at its ends respectively to the spring attachment portion 254 of the clamp 250 and projection 176 of the link 170 as shown in FIGS. 21 and 22. When the carriage is in the non-engagement position (see FIG. 21), the camming action between projection 177 and the camming portion 252 overcomes the spring bias to rotate the clamp 250 away from the recording medium assembly. However, when carriage is in the non-engagement position (see FIG. 22), the spring serves to pull the clamp 250 at its spring attachment portion 254, so that the flat portion 253 clamps down on the recording medium assembly with greater force.

While preferred embodiments of the present invention have been described above using illustrative examples, it will be understood by those skilled in the art that the invention is not limited by the illustrative examples and that various changes and modifications may be made without departing from the spirit or scope of the invention as set forth in the following claims.

What is claimed is:

1. A transport system for moving a recording medium assembly along a first axis, the transport system comprising:

a transport member which is translatable along the first axis, the transport member including a engagement piece which is translatable along a second axis, which is perpendicular to the first axis, so that the engagement piece moves along the second axis between an engagement position and a non-engagement position with respect to said recording medium assembly, wherein translation of said transport member when said engagement piece is in said engagement position moves said recording medium assembly;

a crank having a first attachment point, a second attachment point and a pivot point, such that the first attachment point, the second attachment point and the pivot point are not co-linear, with the first attachment point being linked to the engagement piece; and an engagement actuator which is translatable between a first position and a second position and is linked to the second attachment point so that when the engagement actuator moves from the first position to the second position, the movement pivots the crank about the pivot point and causes the engagement piece to move from the non-engagement position to the engagement position.

2. The transport system according to claim 1, wherein a crank angle between the first attachment point and the second attachment point about the pivot point is approximately 90°.

3. The transport system according to claim 1, wherein the crank is a bell crank.

4. The transport system according to claim 1, wherein the engagement actuator includes a solenoid having a projection which is translatable between the first position and the second position.

5. The transport system according to claim 4, wherein the solenoid is a bi-stable solenoid.

6. The transport system according to claim 1, further comprising a carriage bottom, with the engagement actuator being mounted on the carriage bottom and the pivot point being rotatably engaged the carriage bottom.

7. The transport system according to claim 6, further comprising a carriage top which is mounted to the carriage bottom, with the crank is disposed between the carriage top and the carriage bottom so that it is free to rotate about the pivot point.

8. The transport system according to claim 7, further comprising a post which is engaged with the carriage top so that the carriage top can move along the post along a third axis which is perpendicular to both the first and second axes.

9. The transport system according to claim 7, further comprising a worm screw having a central axis rotatably engaged with the carriage bottom and with the transport member so that rotation of the worm screw about its central axis causes the transport member to move in the direction of the first axis relative to the carriage bottom.

10. A transport system for moving a recording medium assembly along a first axis, the transport system comprising:

a transport member which is translatable along the first axis, the transport member including a engagement piece which is translatable along a second axis, which is perpendicular to the first axis, so that the engagement piece moves along the second axis between an engagement position and a non-engagement position with respect to said recording medium assembly, wherein translation of said transport member when said engagement piece is in said engagement position moves said recording medium assembly;

a first link which is slidably engaged with the engagement piece so that the engagement piece is slidable along the first axis with respect to the first link, and so that motion of the first link along the second axis causes motion of the engagement piece in the direction of the second axis;

a first crank having a first attachment point, a second attachment point and a pivot point, such that the first attachment point, the second attachment point and the pivot point of the first crank are not co-linear, with the first attachment point of the first crank being linked to the first link so that rotation of the first crank about the pivot point of the first crank causes the first link to move in the direction of the second axis;

a second crank having a first attachment point, a second attachment point and a pivot point, such that the first attachment point, the second attachment point and the pivot point of the second crank are not co-linear, with the first attachment point of the second crank being linked to the first link so that rotation of the second crank about the pivot point of the second crank will cause the first link to move in the direction of the second axis;

a second link which is rotatably engaged with the second attachment point of the first crank at a first crank engagement portion and is rotatable engaged with the second attachment point of the second crank at a second crank engagement portion, so that when the first crank engagement portion is rotated about the pivot point of the first crank and the second crank engagement portion is rotated about the pivot point of the second crank, then the first crank rotates about the pivot point of the first crank and the second crank rotates about the pivot point of the second crank;

an engagement actuator which is translatable between a first position and a second position and is linked to the second link so that when the engagement actuator moves from the first position to the second position, the movement cause the second link to move along a path such that the first crank engagement portion rotates about the pivot point of the first crank and the second crank engagement portion rotates about the pivot point of the second crank.

11. The transport system according to claim 10, wherein a crank angle is defined as an angle between the first attachment point of the first crank and the second attachment point of the first crank about the pivot point of the first crank;

a third axis is defined as the direction the engagement actuator moves in moving between the first and second positions; and an angle between the second axis and the third axis is approximately equal to the crank angle.

* * * * *